United States Patent [19]
Otsuki et al.

[11] 3,884,846
[45] May 20, 1975

[54] PROCESS FOR PRODUCING MATERIALS WHICH COMPLEX HEAVY METALS IN LIQUID

[75] Inventors: Susumu Otsuki; Isao Miyanohara; Norimasa Mizui; Hideo Kawamura, all of Shin Nanyo, Japan

[73] Assignee: Toyo Soda Manufacturing Co., Ltd., Japan

[22] Filed: May 17, 1973

[21] Appl. No.: 361,313

[30] Foreign Application Priority Data
May 23, 1972 Japan................................ 47-50376
May 30, 1972 Japan................................ 47-53010

[52] U.S. Cl.......................... 260/2.2 R; 260/92.8 A
[51] Int. Cl.......................... C08f 27/08; C08f 27/02
[58] Field of Search..................... 260/92.8 A, 2.2 R

[56] References Cited
FOREIGN PATENTS OR APPLICATIONS
114,943   10/1958   U.S.S.R.
6,500,661  1/1965   Netherlands OTHER PUBLICATIONS
Takemoto, Kogyo Kagaku Zasshi 62, 1934–1935 (1959).
Audsley et al., Inst. Mining Met., Trans., Sect. C 75(712), C12–C25 (1966).
Mori et al., Kobunshi Kagaku 28(309), 85–90 (1971).
Takemoto, Kogyo Kagaku Zasshi 63, 183–185 (1960).

*Primary Examiner*—Melvin Goldstein
*Attorney, Agent, or Firm*—Oblon, Fisher, Spivak, McClelland & Maier

[57] ABSTRACT

A process is described for the separation of heavy metals from solutions by treating solutions containing the heavy metals with partially dehydrochlorinated polyvinylchloride whose ability to complex heavy metals is enhanced by treatment with at least one reagent selected from the group consisting of urea, ammonia and amines and/or at least one reagent selected from the group consisting of thiols, thiazoles, dithiocarbamates, thiourea, guanidine, thiolignin, carbon disulfide, sodium hydrosulfide and thiocyanates.

12 Claims, No Drawings

PROCESS FOR PRODUCING MATERIALS WHICH COMPLEX HEAVY METALS IN LIQUID

BACKGROUND OF THE INVENTION

1. Field of the Invention

The present invention relates to a process for preparing a specific material which complexes heavy metals present in liquids.

2. Description of the Prior Art

Water and air pollution have recently become of increasing serious public concern. A problem of particular concern associated with water pollution is the drainage from industrial plants which contain heavy metals. These metals pose a serious health problem, and the need for rigid control over mercury, cadmium, chrome, lead, copper and zinc water pollutants is urgently needed. Water pollution caused by other heavy metals not mentioned above must also be prevented by any means, because heavy metals in general have harmful effects on the human body. The method currently used to remove these harmful heavy metals in polluted water generally are unsatisfactory, and further, for practical applications they are costly.

The disposal of other industrial wastes, plastic wastes in particular, is also posing a serious environmental pollution problem because of the steadily increasing production of plastics. Among the plastics included in industrial wastes are polyvinyl chloride wastes which involve difficulties in their disposal.

A need, therefore, exists for methods by which industrial waste waters can be easily, efficiently and economically treated to separate heavy metal and polyvinyl chloride impurities. Recent investigations, which have led to the subject invention, have been concerned with these two problems. As a result of these investigations a method has been found which solved the two environmental problems simultaneously.

SUMMARY OF THE INVENTION

Accordingly, one object of the present invention is to provide a material which can effectively complex heavy metals in polluted water cheaply by utilizing industrial wastes containing polyvinyl chloride which is normally difficult to dispose.

Briefly, this object and other objects of this invention as hereinafter will become readily apparent can be attained by a process which comprises pulverizing the reaction product from the incomplete dehydrochlorination reaction of polyvinyl chloride (this product is obtained by the pyrolysis of polyvinyl chloride with the elimination of hydrogen chloride) into granular particles of a suitable size and then treating said pulverized reaction product with at least one reagent selected from the group consisting of urea, ammonia and amines and/or with at least one reagent selected from the group consisting of thiols, thiazoles, dithiocarbamates, thiourea, guanidine, thiolignin, carbondisulfide, sodium sulfide, sodium hydrosulfide and thiocyanates.

DESCRIPTION OF THE PREFERRED EMBODIMENTS

The polyvinyl chloride which may be used in this invention includes those products produced in conventional equipment and/or both hard and soft polyvinyl chloride products which were made for other purposes and had become waste products.

Most plastics, including polyvinyl chloride, have some degree of elasticity and are, consequently, extremely difficult to pulverize into suitable grain sizes. Furthermore, when pulverized, untreated polyvinyl chloride is reacted or treated with a reagent, swelling of the polyvinyl chloride occurs in the reaction system. The polyvinyl chloride may dissolve in the solvent depending upon the kind of solvent employed which causes the viscosity of the solution to increase which makes stirring difficult, or gelation of the liquid may occur. The polymer obtained in this manner may have the capacity to complex heavy metals, but is impractical for use in large-scale water treatment because it swells in the liquid and its strength is insufficient.

Polyvinyl chloride, however, when it is pyrolyzed, dehydrochlorinates slowly and gradually loses its chlorine content and its plasticity as well. As a consequence it becomes harder and amenable to pulverization. It also becomes insoluble in such good solvents for polyvinyl chloride as tetrahydrofuran, dimethylformamide, methyl ethylketone, and the like. The reaction product of the incomplete dehydrochlorination of polyvinyl chloride in which more than 5%, particularly more than 10% of the chlorine originally present in the polyvinyl chloride is dissociated completely loses its elasticity. In this form, polyvinyl chloride is very easily pulverized into particles of sizes suitable for the complexation of heavy metals. The pulverized product does not swell when it is reacted with a reagent in a liquid, nor does it melt thus increasing the viscosity of the liquid or cause the liquid to gel, so that a stable reaction process may be maintained. The heavy metal complexing material obtained in this way does not swell when immersed in aqueous solutions to complex the heavy metals, and its physical strength is substantial. In other words, the heavy metal complexing material obtained in this manner described not only has a greater ability to complex heavy metals, but also possesses superior physical properties during the manufacturing process and as the product itself. All of these factors added to the usefulness of the material. If the extent of dehydrochlorination is too great, the strength of the polymer obtained decreases and the polymer does not readily react with various reagents so that the complexing ability of the polymer decreases. Normally, therefore, polyvinyl chloride from which 5 to 90%, preferably from 10 to 80%, of its chlorine content is removed is used. Optimumly, polyvinyl chloride is used from which 10 to 60% of its chlorine content is removed. In order to obtain polyvinyl chloride polymer with its chlorine content reduced to the optimum levels required, the polymer is normally heated to 150°–300° C in a rotary kiln, kneader or extruder from about one half hour to several hours. The heating temperature may be lowered when the dehydrochlorination reaction is conducted in catalytically active solvents. The pyrolytic treatment can also be effectively performed in a fluidized bed of a material such as sand.

The reaction product from the partial dehydrochlorination of polyvinyl chloride obtained in the manner described is pulverized in a pulverizer and particles of the desired grain sizes are obtained by passing the pulverized material through a sieve. The material is then reacted with a reagent. Suitable reagents include at least one reagent selected from the group consisting of urea, ammonia and amines and/or at least one reagent selected from the group consisting of thiols, thiazoles, dithiocarbamates, thiourea, guanidine, thiolignin, carbon-disulfide, sodium sulfide, sodium hydrosulfide and thiocyanates. Suitable amines include alkylamines, alkylpolyamines, aromatic amines and hydroxyamines.

Although a reaction product is obtained which has a sufficient ability to complex heavy metals by reacting the reaction product of the incomplete dehydrochlorination of polyvinyl chloride with a member from either one of the two groups of reagents, a superior product is obtained when the polyvinyl chloride product is reacted with at least two different kinds of reagents.

In order to react the dehydrochlorinated polyvinyl chloride product with more than one reagent, the polymer is simply treated with a first reagent such as diethanolamine, for example, and then with a second reagent such as sodium hydrosulfide. By a similar process other combinations of reagents can be reacted with the polymer. When these reactions are conducted in a solvent, a solvent is preferably used whose boiling point is high and which readily dissolves the reagents. Suitable solvents include water, dimethylformamide, dimethysulfoxide, ethylene glycol, glycerine, nitrobenzene and the like. If the reagent is liquid, the use of a solvent is not especially required. Of course, the higher the reaction temperature, the faster the reaction proceeds. However, the reaction temperature used is limited by the boiling point of the solvent. If circumstances require, the reaction may be advantageously conducted under pressure. Suitable reaction temperatures generally range from 50° to 200°C, preferably in the range of 80° to 180°C. The presence of inorganic salts in the reaction system has several good effects on the reaction including increasing the reaction rate. If the concentration of the reagent is sufficiently high in the reaction medium, the liquid can be used over and over again.

The heavy metal complexing material of this invention complexes heavy metals in solution by simple contact with the solution containing them. Whenever the activity of the polyvinyl chloride product begins to decrease after repeated exposure to solutions containing the heavy metal ions the ability of the polymer to complex the metals is simply regenerated by washing the complexed polymer with an aqueous solution of alkali, acid or salt. The heavy metals complexed by the polymer can be recovered simultaneously in the washing process.

Having generally described this invention, a further understanding can be obtained by reference to certain specific examples which are provided herein for purposes of illustration only and are not intended to be limiting unless otherwise specified.

EXAMPLE 1

A 10 gram amount of polyvinyl chloride powder of an average degree of polymerization of 800 as determined by viscosity measurements (Zeron 103 EP-8 made by Nihon Zeon Co.) was placed into a stainless steel tube with an inside diameter of 15mm and a length of 100mm, and was heated to 230°C at a rate of 5°– 7°C/min in an electric furnace while nitrogen was flushed into the tube through its base. This temperature was maintained for 1 hour, and then the polymer was removed from the tube. Approximately 28% of the chlorine originally present in the polyvinyl chloride was pyrolytically removed.

The reaction product of the partial dehydrochlorination of polyvinyl chloride obtained in this manner was pulverized and separated into a uniform distribution of particle sizes of 28 – 35 mesh. A 2 gram amount of the pulverized polymer was placed into a 300ml flask to which 10 grams of sodium hydrosulfide dissolved in 100ml of ethyleneglycol was added. The mixture was heated for 10 hours in an oil bath at 150°C while being stirred. Then the polymer was removed from the flask, and after filtering and washing the product with water, it was dried at 80°C under a reduced pressure of 20mm Hg. By this procedure a suitable heavy metal complexing material was obtained.

A 1 gram amount of the heavy metal complexing material so obtained was placed into a 500ml Erlenmyer flask with 100ml of an aqueous solution of $HgCl_2$ containing 1.6ppm $Hg^{++}$ (in addition to a solution containing 0.1% NaCl by weight) whose pH was adjusted to 3 by the addition of HCl. The solution in the flask was thoroughly mixed by stirring in a shaking apparatus for 30 minutes. The contents of the flask were removed and filtered, and the mercury content in the filtrate was determined according to a standard procedure for the determination of mercury as described by JIS (Japanese Industrial Standard) K-0102,44.1.1. The results showed a $Hg^{++}$ content below 0.01ppm.

EXAMPLE 2

The reaction product from the partial dehydrochlorination of polyvinyl chloride from which about 41% of the original amount of chlorine was removed, was obtained in a manner similar to the procedure described in Example 1 except that the pyrolysis treatment was performed at a temperature of 240°C. The reaction product was pulverized into grain sizes of 28 – 35 mesh, and 2 grams of the pulverized product was added to a liquid which contained 10 grams of thiourea mixed with 100ml of dimethyl formamide. The mixture was heated in an oil bath at 130°C with stirring for 10 hours, filtered, washed in water and dried as in Example 1 to yield a heavy metal complexing material.

When the aqueous solution containing mercury as described in Example 1 was treated with 0.5 gram of the heavy metal complexing material obtained in this manner, the mercury concentration which was originally 1.6ppm was reduced to below 0.01ppm.

EXAMPLE 3

A reaction product from the partial dehydrochlorination of polyvinyl chloride from which about 20% of the originaly amount of chlorine was removed was obtained in a manner similar to that described in Example 1 except that the pyrolysis temperature was raised to 210°C. The reaction product was pulverized into grain sizes of 28 – 35 mesh, and 2 grams of the pulverized product were placed into a liquid consisting of 10 grams of diethanolamine dissolved in 100 ml of glycerine. The mixture was heated in an oil bath at 160°C with stirring for 10 hours, filtered, washed with water and dried as described in Example 1 to yield a heavy metal complexing material.

When the mercury solution shown in Example 1 was treated with 1 gram of this heavy metal complexing material, the mercury concentration which was originally 1.6ppm, dropped below 0.01ppm.

EXAMPLE 4

A reaction product from the partial dehydrochlorination of polyvinyl chloride from which about 60% of the original amount of chlorine was removed, was obtained in a manner similar to that described in Example 1 except that the pyrolysis temperature was 250°C which was maintained for 30 minutes. The reaction product was pulverized into grain sizes of 28 – 35 mesh, and 2 grams of the pulverized product were placed into a solution containing 5 grams of ethylphenyl zinc dithiocarbamate mixed with dimethyl formamide. The mixture was heated in an oil bath at 130°C with stirring for 5 hours, filtered, washed in water and dried as described in Example 1 to yield a heavy metal complexing material.

When the mercury solution of Example 1 was treated with 0.3 gram of this heavy metal complexing material, the mercury concentration which was originally 1.6ppm dropped below 0.01ppm.

EXAMPLE 5

A 0.2 gram amount of the heavy metal complexing material obtained in Example 3 was placed into a 500ml Erlenmyer flask, and 100ml of an aqueous solution of $HgCl_2$ with a $Hg^{++}$ concentration of 36ppm (in addition to a solution containing 0.1% NaCl by weight, the pH of which had been adjusted to 3 by the addition of HCl) was added. The pulverized polyvinyl chloride polymer eventually obtained was treated with a mercury solution as described in Example 1. The mercury concentration which was originally 36ppm dropped to 3.2ppm.

EXAMPLE 6

A 2 gram amount of the heavy metal complexing material obtained in Example 3 was placed for further processing into a liquid consisting of 10 grams of urea in 100ml of dimethylformamide. The mixture was heated in an oil bath at 130°C with stirring for 10 hours. After filtering, washing in water and drying as described in Example 1, a heavy metal complexing material was obtained.

When 100ml of the mercury solution described in Example 5 was treated with 0.2 gram of this heavy metal complexing material, the mercury concentration which was originally 36ppm dropped down to 0.5ppm.

EXAMPLE 7

A reaction product from the partial dehydrochlorination of polyvinyl chloride from which about 14% of the original amount of chlorine was removed was obtained in a manner similar to that described in Example 1, except that the pyrolysis temperature of 200°C was maintained for 1 hour. A 2 gram amount of this reaction product, which was pulverized into grain sizes of 28 – 35 mesh, was placed into a 300ml flask containing 100 grams of ethylenediamine. The mixture was heated in an oil bath at 120°C with stirring for 5 hours. The polymer was removed from the flask, filtered, washed in water and dried by heating under a reduced pressure of 20 mmHg at 80°C to yield a heavy metal complexing material.

A 2 gram amount of the heavy metal complexing material so obtained was placed into a 500ml Erlenmyer flask, and 100ml of an aqueous solution of $HgCl_2$ at a $Hg^{++}$ concentration of 1.6ppm (in addition to a solution containing 0.1% NaCl by weight at a pH of 3.0 which was adjusted with hydrochloric acid) was added. The mixture was thoroughly stirred for 30 minutes in a shaking apparatus. Thereafter, the contents were removed and filtered. The mercury in the filtrate was determined by the JIS K-0102, 44.1.1 method. The mercury concentration, which was originally 1.6ppm, was found to have dropped below 0.005ppm.

Again, when 100ml of an aqueous solution of 1.8ppm zinc chloride was similarly treated with 0.2 gram of this water treatment material and the resulting zinc concentration was determined by the JIS K-0101, 38.1.1 method, the concentration of zinc was found to have dropped below 0.01ppm.

EXAMPLE 8

A reaction product from the partial dehydrochlorination of polyvinyl chloride from which approximately 31% of the original amount of chlorine was removed was obtained in a manner similar to that described in Example 1 except that the pyrolysis temperature was raised to 240°C and maintained for 30 minutes. The reaction product was pulverized into grain sizes of 28 – 35 mesh. A 2 gram amount of the pulverized polymer and 20 grams of hexamethylenediamine dissolved in 100 grams of dimethylformamide were heated in a silicon oil bath at 120°C as described in Example 1. The product obtained was filtered, washed in water and dried to yield a heavy metal complexing material.

When 100ml of the aqueous solution of $HgCl_2$ shown in Example 1 was treated with 0.2 gram of the heavy metal complexing material, the concentration of mercury which was originally 1.6ppm dropped below 0.005ppm.

EXAMPLE 9

A reaction product from the partial dehydrochlorination of polyvinyl chloride from which approximately 59% of the original amount of chlorine was removed was obtained in a manner similar to that described in Example 1 except that the pyrolysis temperature was raised to 250°C and maintained for 10 hours. A 2 gram amount of the reaction product, which was pulverized into grain sizes of 28 – 35 mesh, and 20 grams of triethylenetetramine dissolved in 100 grams of dimethylsulfoxide containing 20% by weight water were heated in an oil bath at 130°C as described in Example 1. A heavy metal complexing material was obtained by filtering, washing in water and drying the treated polymer.

When 100ml of an aqueous solution of $HgCl_2$ shown in Example 1 was treated with 0.2 gram of this heavy metal complexing material in a manner similar to that described in Example 1, the concentration of mercury, which was originally 1.6ppm, dropped below 0.005ppm.

EXAMPLE 10

When 100ml of an aqueous solution of $HgCl_2$ shown in Example 5 was treated with 0.2 gram of the heavy metal complexing material obtained in Example 7 in a manner similar to that described in Example 5, the concentration of mercury, which was originally 36ppm, dropped below 1.3ppm.

EXAMPLE 11

A 2 gram amount of the heavy metal complexing material obtained in Example 7 was added to a liquid in which 5 grams of sodium hydrosulfide was dissolved in 100 grams of dimethylformamide, and heated in an oil bath at 130°C with stirring for 10 hours. A heavy metal complexing material was obtained by filtering, washing in water and drying the pulverized polymer obtained as described in Example 1.

When 100ml of the mercury solution shown in Example 5 was treated with 0.2 gram of the heavy metal complexing material, the mercury concentration which was originally 36ppm, dropped to 0.05ppm.

EXAMPLE 12

A 2 gram amount of the heavy metal complexing material obtained in Example 7 was placed into a liquid in which 10 grams of $CS_2$ was dissolved in 100 grams of ethanol, and heated in an oil bath at 60°C with stirring for 10 hours. The product eventually obtained was filtered, washed in water and dried as described in Example 1 to yield a heavy metal complexing material.

When 100ml of the aqueous solution of $HgCl_2$ shown in Example 5 was treated with 0.2 gram of the heavy metal complexing material in a manner similar to that described in Example 5, the concentration of mercury, which was originally 36ppm, dropped to 0.05ppm.

EXAMPLE 13

A 2 gram amount of the heavy metal complexing material obtained in Example 8 was placed into a liquid in which 30g of thiourea was dissolved in 100g of dimethylformamide, and heated in an oil bath at 130°C with stirring for 10 hours. The product eventually obtained was filtered, washed in water, and dried as described in Example 1 to yield a heavy metal complexing material.

When 100ml of the aqueous solution of $HgCl_2$ shown in Example 5 was treated with 0.2g of the heavy metal complexing material in a manner similar to that described in Example 5, the concentration of mercury, which was originally 36ppm, dropped to 0.08ppm.

EXAMPLE 14

The reaction product from the partial dehydrochlorination of polyvinyl chloride obtained in Example 1 was pulverized into grain sizes of 28 – 35 mesh, and 2g of the pulverized product was placed into a liquid in which 10g of aminophenol was mixed with dimethylformamide. The mixture was heated in an oil bath at 130°C with stirring for 10 hours, filtered, washed in water and dried as described in Example 1, to yield a heavy metal complexing material.

When 100ml of the aqueous solution of $HgCl_2$ shown in Example 5 was treated with 0.2g of the heavy metal complexing material in a manner similar to that described in Example 5, the concentration of mercury, which was originally 36ppm, dropped to 4.5ppm.

EXAMPLE 15

A 2g quantity of the heavy metal complexing material obtained in Example 14 was added to a liquid in which 10g of NaSH was dissolved in 100ml of dimethylformamide. The mixture was heated in an oil bath at 130°C with stirring for 10 hours, filtered, washed in water and dried as described in Example 1 to yield a heavy metal complexing material.

When 100ml of the aqueous solution of $HgCl_2$ shown in Example 5 was treated with 0.2g of this heavy metal complexing material in a manner similar to that described in Example 5, the concentration of mercury, which was originally 36ppm, dropped to 0.6ppm.

Having now fully described the invention, it will be apparent to one of ordinary skill in the art that many changes and modifications can be made thereto without departing from the spirit or scope of the invention as set forth herein.

What is claimed as new and intended to be covered by letters Patent is:

1. A process for the production of a heavy metal complexing material which comprises reacting a reaction product from the partial dehydrochlorination reaction of polyvinylchloride from which 5 –90% of its chlorine content is removed, with at least one amine reagent selected from the group consisting of alkylamines, alkylpolyamines, and hydroxyamines.

2. The process of claim 1, wherein said reaction product is a particulate or powder material.

3. The process of claim 1, wherein said reaction is conducted in a solvent for said reagent.

4. The process of claim 3, wherein said solvent is selected from the group consisting of water, dimethylformamide, dimethylsulfoxide, ethyleneglycol, glycerine and nitrobenzene.

5. The process of claim 4 wherein said reaction is conducted at 50° to 200°C.

6. The process of claim 5 wherein said reaction is conducted under pressure.

7. The process of claim 1 wherein the amine is selected from the group consisting of diethanolamine, ethylenediamine, hexamethylenediamine and triethylenetetramine.

8. The process of claim 1, wherein the partially dehydrochlorinated polyvinylchloride is obtained by the pyrolysis of a polyvinylchloride resin.

9. The process of claim 1, wherein the reaction product from the partial dehydrochlorination reaction of polyvinylchloride is pulverized before reaction with the amine reagent.

10. The process of claim 1, wherein the reaction product from the partial dehydrochlorination reaction of polyvinylchloride has from 10 – 60% of its chlorine content removed.

11. The process of claim 8, wherein the pyrolysis takes place at a temperature of from 150°–300°C.

12. The process of claim 1, which further comprises reacting the reaction product from the partial dehydrochlorination reaction of polyvinylchloride with at least one reagent selected from the group consisting of thiourea, ethylphenyl zinc dithiocarbamate, guanidine, carbondisulfide, sodium sulfide and sodium hydrosulfide.

* * * * *